United States Patent [19]

Yon, Jr.

[11] Patent Number: 4,762,295

[45] Date of Patent: Aug. 9, 1988

[54] AEROSTAT STRUCTURE WITH CONICAL NOSE

[75] Inventor: Terrell H. Yon, Jr., Cocoa Beach, Fla.

[73] Assignee: General Electric Company, Schenectady, N.Y.

[21] Appl. No.: 934,909

[22] Filed: Nov. 25, 1986

[51] Int. Cl.$^4$ .................................................. B64F 1/14
[52] U.S. Cl. ..................................... 244/115; 244/30; 244/126
[58] Field of Search ................... 244/30, 29, 115, 116, 244/125, 126, 114, 117, 31

[56] References Cited

U.S. PATENT DOCUMENTS

| | | |
|---|---|---|
| 1,311,237 | 7/1919 | Laisey . |
| 1,541,827 | 6/1925 | Laisy ................................ 244/125 |
| 1,623,649 | 4/1927 | Zimmerman . |
| 1,656,137 | 1/1928 | Bradford . |
| 1,815,338 | 7/1931 | Strauss . |
| 2,109,529 | 3/1938 | Goddard ............................ 244/117 |
| 2,150,428 | 3/1939 | Crom et al. ........................ 244/115 |
| 3,871,603 | 3/1975 | Menke et al. ..................... 244/125 |
| 4,033,527 | 7/1977 | Parsons ............................. 244/30 |
| 4,534,525 | 8/1985 | Bliamptis ......................... 244/125 |

OTHER PUBLICATIONS

Five photographs labelled 1 through 5.

Primary Examiner—Joseph F. Peters, Jr.
Assistant Examiner—Lynn M. Fiorito
Attorney, Agent, or Firm—Robert A. Cahill

[57] ABSTRACT

An inflatable hull has an integral nose section comprising an array of trapezoidal fabric sections secured to form a frustro-conical volume. A nose cap is secured to the end of the frustrum with a conical array of tensioned ropes secured at their ends to the hull. The conical volume side walls at the nose taper to the cone axis at an angle such that a vertical load at the nose apex or an axial load on the region of the nose next to the apex does not bend, collapse or otherwise damage the nose section to provide a soft mooring attachment for the aerostat.

18 Claims, 4 Drawing Sheets

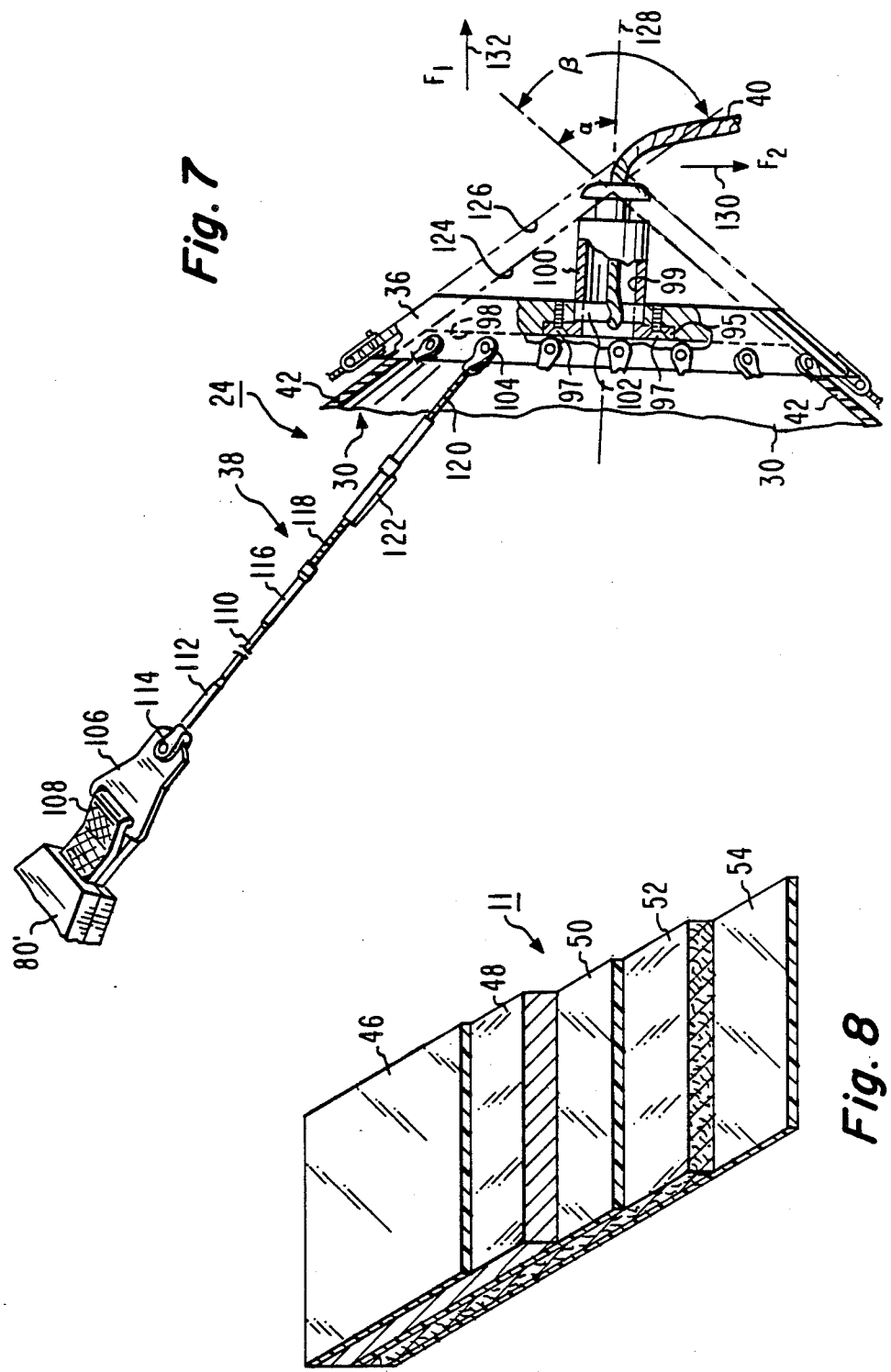

AEROSTAT STRUCTURE WITH CONICAL NOSE

This invention relates to an aerostat structure, and, more particularly, to the nose construction of the aerostat.

Aerostats are lighter-than-air inflatable balloons comprising a hull fabricated from fabric and further including fins located at the tail of the hull for aerodynamic stabililty. The nose of the aerostat is normally bulbous. Depending from the sides of the aerostat hull in spaced relationship are a number of sets of pairs of mooring ropes known as close haul ropes. The mooring ropes secure the aerostat to a terrestrial station and may be attached to winches for bringing the aerostat down from its airborne position. A mooring rope is sometimes attached to the nose.

Aerostats are presently moored via their nose to a rigid mooring cone secured to a terrestrial station. The cone embraces the aerostat nose with a nose rope passing through the apex of the mooring cone to a winch. The close haul ropes are employed to winch the aerostat toward its moored position and to manipulate the aerostat into its proper orientation and location. The nose rope is normally used to secure the aerostat to the mooring cone after the craft is lowered via the close haul ropes.

One example of an aerostat is disclosed in U.S. Pat. No. 3,871,603 which discloses a nose assembly fabricated from aluminum utilized to aid in mooring the aerostat. Such a structure tends to be relatively heavy. Other noses are fabricated with reinforced nose battens as disclosed, for example, in U.S. Pat. No. 1,623,649. These nose battens are rigid structures and tend to be relatively heavy. The battens are used to moor the air ship and reinforce the nose during mooring. Because the rigid nose battens are relatively heavy, they tend to decrease the aerostat payload capability.

Recently, the prior rigid conical structure of the nose batten was removed from the nose of the aerostat and its equivalent was secured to the uppermost region of a mooring pole. The nose of the aerostat was replaced with what is now known as a soft mooring structure.

A soft mooring structure, in one example, comprises a cigar-like inflatable stanchion which projects forward from the large bulbous front of the aerostat nose. A nose cap of rigid metal construction is secured to the extended tip of the nose stanchion. A conical array of ropes, usually 16, secure the cap to the aerostat hull. A nose rope is attached to the nose cap to secure the aerostat to the stationary mooring cone. The stanchion spaces the nose cap from the bulbous nose of the aerostat. The nose cap distributes the mooring forces to the conical array of ropes which transmit the forces to the hull sides. This arrangement causes the mooring loads to be at the ring of the mooring cone on the bulbous nose of the aerostat. That is, the mooring forces in a soft mooring structure are spread over a large region of the hull.

Two pairs of close haul ropes on the sides of the aerostat, one pair on each side, are employed for lowering the aerostat to the level of the mooring cone. The nose rope is not used for lowering purposes because the nose stanchion, being inflatable, would readily bend and distort should any transverse downward pulling forces be exerted on it. The inflatable nose stanchion, because of its rod-like shape, only bears axial forces and is transversely weak. The stanchion tends to bend, distort, or otherwise collapse in response to transverse aerostat lowering forces of significant magnitude which forces are normal to the longitudinal axis of the stanchion. At time, during mooring operations for example, wind gusts occasionally shift the position of the aerostat and cause vertical, non-axial forces to be imposed upon the inflatable stanchion. This tends to damage the stanchion and could result in costly repairs. Therefore, a need is seen for a nose construction for an inflatable aerostat which alleviates the weight problem associated with the rigid batten nose reinforcing structure and the stanchion collapsing problem of the soft mooring structure.

An aerostat structure in accoordance with the present invention comprises an inflatable hull including a forward substantially conical nose section which defines a cone axis, a central body section and a rearward tail section, all of the sections being inflatable as an integral unit. The nose section comprises an inflatable envelope which tapers to its cone apex at a given angle to the cone axis. A mooring nose cap has a conical recess which is dimensioned to closely receive therein and abut the nose section at the cone apex. Cap securing means includes a plurality of ropes to secure the cap to the hull at a region spaced from the nose apex. The ropes lie in a conical envelope which is closely spaced from and juxtaposed with the nose section conical envelope wherein the envelopes are similar cones.

The given angle has a value sufficiently great such that a force on the cone normal to the axis at the apex is counteracted with a sufficient reaction force created by the hull internal pressure to preclude significant bending of the nose section relative to the body section in a direction normal to the axis. The given angle has a value sufficiently small to preclude significant inward collapsing of the nose section in response to an axially directed force on the nose in a direction along the axis.

In the drawing:

FIG. 7 is a side elevation view, fragmented, partially in section, of a nose of the embodiment of FIGURE 2; and FIG. 8 is an isometric view of the hull fabric showing the fabric construction in more detail.

Figure 1:
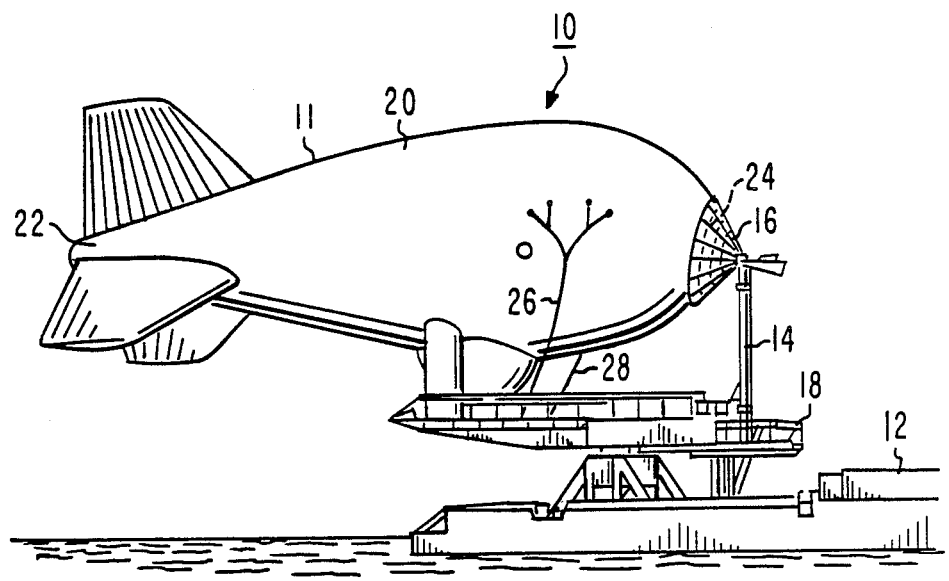
FIG. 1 is a side elevation perspective view of an aerostat in accordance with one embodiment of the invention moored to a ship.

In FIG. 1, aerostat 10 is shown moored to a ship 12 by a mooring pole 14 and a mooring cone 16 attached to the upper end of pole 14. Pole 14 is secured to a platform 18 on the ship 12. The cone 16 and pole 14 are conventional. Pole 14 and cone 16 may also be land based.

The aerostat 10 comprises a central body section 20, a tail section 22, and a nose section 24. Secured to the body section 20 are a pair of close haul ropes 26 and 28.

Ropes 26 and 28 are coupled to winches (not shown) secured to platform 18. Rope 26 is secured to one side of the hull of body section 20 and rope 28 is secured to the opposite side of the body section 20.

Figure 2:
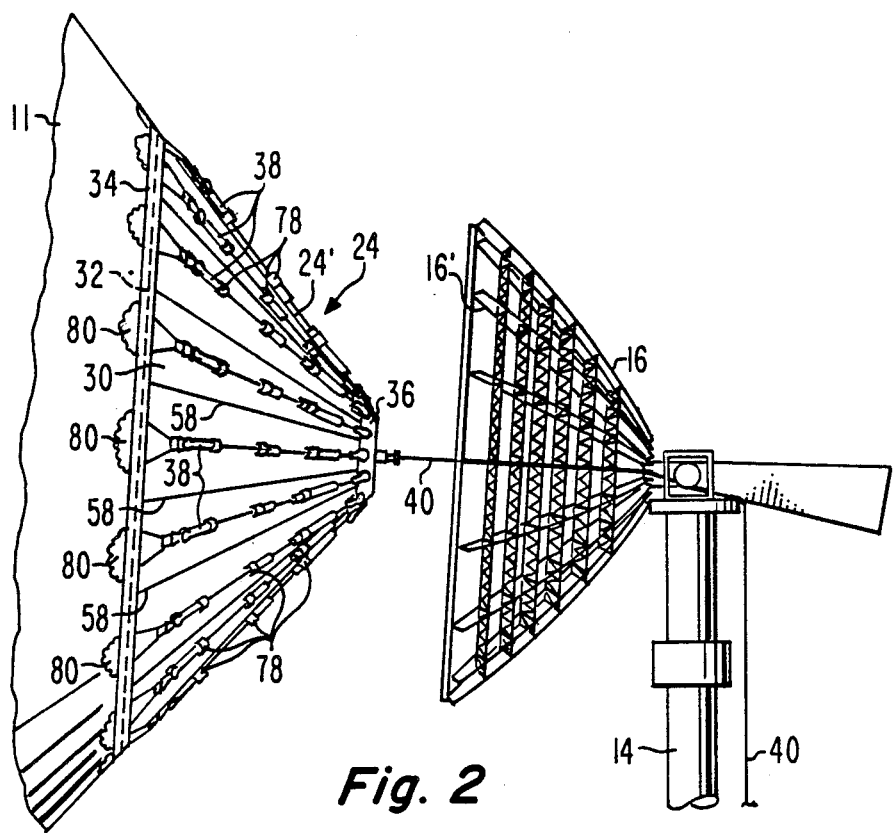
FIG. 2 is a side elevation view showing the nose section and mooring cone of the embodiment of FIG. 1 in more detail.

In FIG. 2, the mooring cone 16 comprises a rigid metal lattice framework whose conical interior 16' closely receives the conical exterior 24' of the nose section 24. Nose section 24 comprises a frustro-conical nose 30 which has a joint 32 with the hull 11 covered with an annular scuff strip 34. A nose cap 36 is secured to the apex of nose 30 by an array of sixteen cable assemblies 38. A nose rope 40 is secured to cap 36 and is threaded through pullies (not shown) at the apex of the mooring cone 16 to a winch (not shown).

Figure 3:
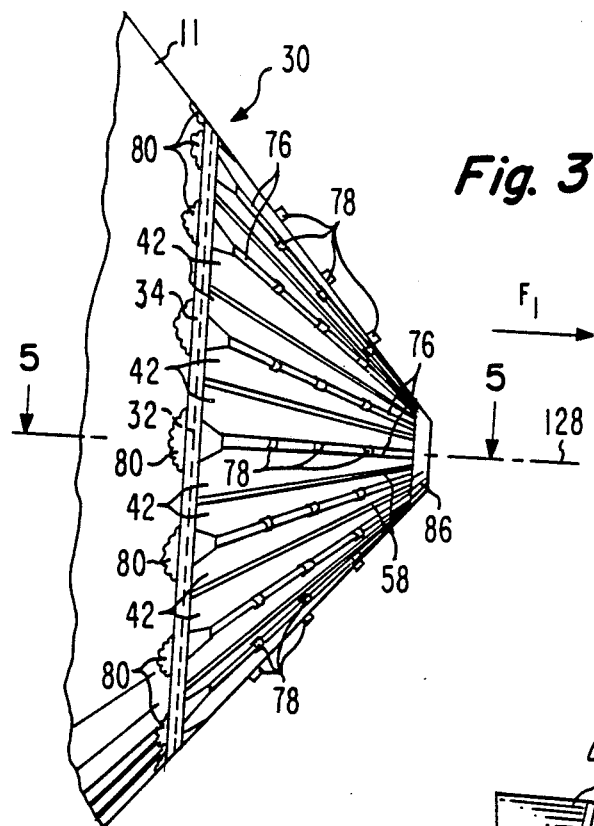
FIG. 3 is a side elevation view of the nose section of the embodiment of FIG. 1 without the mooring ropes and cap attached.
Figure 4:
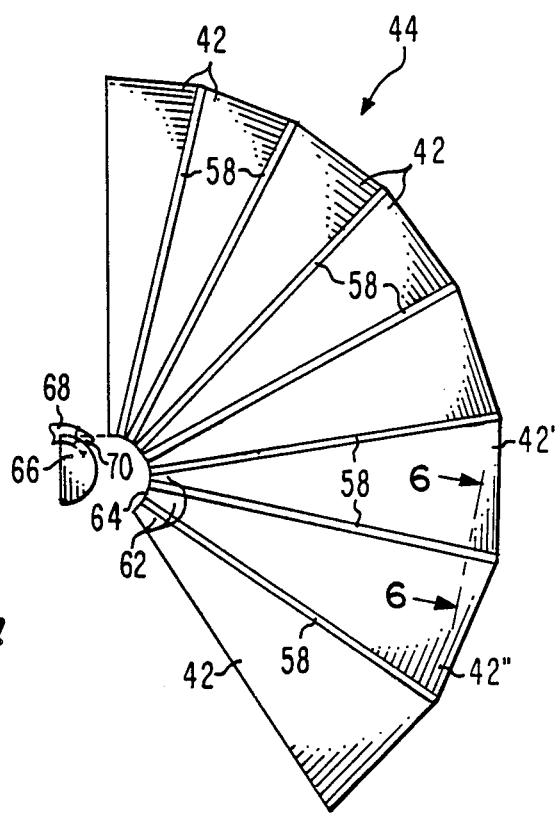
FIG. 4 is an exploded flat pattern layout view of a half section of the conical nose section of the embodiment of FIG. 3.

In FIG. 3, nose 30 comprises a circular array of isosceles trapezoidal sections 42, sixteen in the present embodiment. The side edges of the sections 42 are joined in abutting edge-to-edge relation to form a frustro-conical body. In FIG. 4, the nose 30 is formed into two mirror image halves 44, only one of which is shown, before assembly. Half 44 is representative. The trapezoidal sections 42 are made from the same fabric as the hull 11, FIG. 3. This representative hull construction is shown in FIG. 8.

In FIG. 8, hull 11 may comprise an outer coating 46 of light-stable white pigmented polyester polyurethane applied onto layer 48 which is formed from 4.1 oz.-/yard$^2$ polyester woven fabric. Between layer 48 and layer 52 is a coating of black pigmented polyester polyurethane. Layer 52 is a non-woven oriented fiber polyester fabric. The innermost coating 54 is black pigmented polyester polyurethane.

Figure 6:
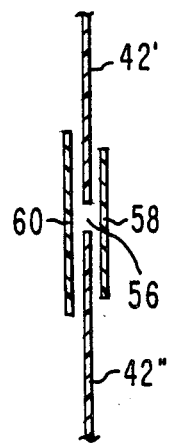
FIG. 6 is a sectional view of the layout of FIG. 4 taken along line 6—6 to show the joint construction of a portion of the nose.

A typical joint between the trapezoidal sections 42, such as the joint between sections 42' and 42", FIGURE 4, is shown in FIG. 6. Trapezoidal sections 42' and 42" lie in the same plane and their junction 56 is shown exploded in FIG. 6. The junction 56 between sections 42' and 42" is shown spaced for purposes of illustration. Sections 42' and 42" normally abut edge to edge. Spaced above junction 56 is a structural tape 58 which is bonded to sections 42' and 42" either by glue, radio frequency (RF) sealing or heat sealing (application of heat and pressure). Directly beneath the junction 56 is a second tape 60. Tapes 58 and 60 have different widths, but are made of similar material, for example, Dacron, a trade-name of Dupont, coated with urethane on both sides.

Tapes 58 and 60 have different widths to avoid stress raising concentration of the tape edges at the same points on sections 41' and 42". The inner structural tape 58 may be 2" wide, for example, and the outer tape 60 may be 1 ¼" wide. The tapes 58 and 60 extend for the length of the junction 56 between sections 42' and 42". This construction is typical for the junctions of all of the sections 42, FIG. 4.

Figure 5:
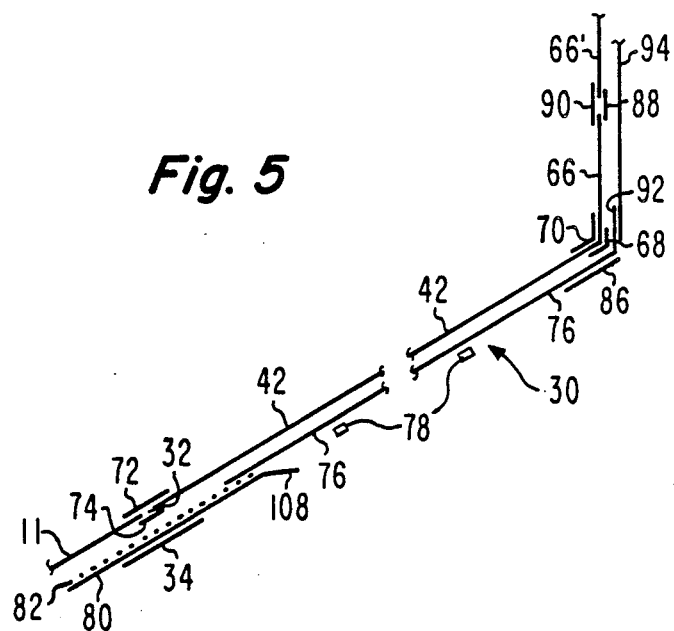
FIG. 5 is a section of the embodiment of FIGURE 3 taken along line 5—5.

The narrow ends 62, FIG. 4, of the sections 42 form a part of a circle 64. A semicircular piece of fabric 66 of the same construction as sections 42 and hull 11 is secured in the partial circular opening formed by ends 62 when the flat pattern layout of FIG. 4 is formed into the conical shape. In FIG. 5, the semicircular section 66 is secured to each section 42 by an outer tape 68 and an inner tape 70 of different widths. The outer tape 68 may be narrower than the inner tape 70. The tapes 68 and 70 may be of similar fabric construction as the tapes 60 and 58 of FIG. 6.

In FIG. 3, the nose 30 comprises the two halves 44 of the construction described above in connection with FIG. 4. The end sections 42 of each of the halves 44 are joined to each other similar to the junction of the sections 42, FIG. 6. The two halves 44, after being formed into a frustro-conical structure, are secured to the hull 11, FIG. 3.

In FIG. 5, the connection of the nose 30 to the hull 11 is represented. The sections 42 are secured to the hull 11 with a circular array of inner tape 72 and outer tape 74 of different widths. Tapes 72 and 74 are glued in place or heat sealed. A narrow scuff strip 76 is glued or heat sealed over a length region of each trapezoidal section 42. The different materials are shown in the exploded view in FIG. 5 for simplicity of illustration. Normally, the different fabrics are juxtaposed in abutting relation.

Bonded to and over the scuff strips 76 is an array of three fabric loops 78 (only two being shown in FIG. 5). The loops 78 are schematically represented in FIG. 5 and are sufficiently large to permit the cables from the cable assemblies 38, FIG. 2, to pass therethrough. A somewhat triangular load patch 80 is glued over the end region of each scuff strip 76 at the joint between a section 42 and the hull 11. There are sixteen sections 42, sixteen scuff strips 76, and sixteen patches 80 spaced in a conical array. The scuff strips 76 and patches 80 are placed over the trapezoidal sections 42 so that they are generally equally spaced around the conical nose. Patch 80 is glued by an adhesive represented by dots 82, FIG. 5. The adhesive 82 is typical for use in the aerostat industry for this purpose and need not be detailed herein.

Bonded over the joint of sections 42 with hull 11 and patches 80 is circular scuff strip 34. A circular scuff strip 86 is bonded over the narrow ends of sections 42 adjacent the circular halves 66 and 66' at the nose apex. Semicircular section 66' is the other half of the nose construction which is a mirror image of the construction of semicircular section 66 of FIG. 4. The semicircular sections 66 and 66' are joined by upper and lower different width tapes 88 and 90, respectively. A circular tape 92 is bonded, e.g., heat sealed, over the circular formed by semicircular sections 66 and 66'. Circular scuff strip 94 is then bonded to and over the two semicircular sections 66 and 66'. All of the trapezoidal sections 42 are joined to the semicircular sections 66' and 66 and to the hull 11 similarly. As a result of the above construction, the nose 30, FIG. 3, is integral with and inflatable with hull 11 as a unitary structure.

In FIG. 7, circular frustro-conical rigid nose cap 36, preferably made of metal, is secured in abutting relation with the apex port of the nose 30. The cap has a frustro-conical recess 98 which closely receives the frustro-conical tip of nose 30. An upstanding probe 100 has a circular flange 95 which is secured to the cap 36 by screws 97. A transverse rope securing pin 102 is secured diametrically across the hollow core 99 of probe 100 by flange 95. Nose rope 40 is secured to pin 102 through the probe 100 hollow core 99.

Each cable assembly 38 is secured at one end to cap 36 with a clevis assembly 104. The other end of assembly 38 is secured to a corresponding patch, such as patch 80', via clevis assembly 114, thimble 106 and a strap 108 which is sewn and otherwise secured to the patch 80'. Assembly 38 comprises a steel rope 110 secured to a connector 112 which, in turn, is secured to thimble 106 with clevis assembly 114. A second connector 116 is secured to the other end of rope 110 and to screw 118. A second screw 120 is secured to clevis assembly 104. A turnbuckle 122 is coupled to screws 118 and 120 for adjusting the length of the connection of cable assembly 38 between thimble 106 and cap 36 to tension the cable. Each of the cable assemblies 38 are juxtaposed in spaced relation above the scuff strips 76, FIG. 5. In addition, the cables 110 are threaded through the loops 78 on the scuff strips 76, FIG. 5. The cables 110 of all of the cable assemblies are adjusted by the turnbuckles 122 until placed in appropriate tension. This secures the cap 96 to the nose 30. After initial rigging is completed and the required lengths are known, the cable assemblies 38 may be replaced with cables of proper length omitting the turnbuckle and screws 118 and 120. A cable in this case has a connector such as connector 112 at both ends for connecting the cable to a thimble 106 and a cap 36.

In FIG. 7, the nose 30 is frustro-conical in section and its projected volume is shown in phantom at 124. The cable assemblies 38 define a cone similar to the cone defined by nose 30. The apex of the cone formed by the cable assemblies 38 is concentric with and spaced in front of the cone formed by nose 30. The projected volume of the cone formed by cable assemblies 38 is shown in phantom at 126. The probe 100 lies within the projected volume 126 formed by the cable assemblies 38. The reason for this is if the probe 100 were to extend beyond that projected volume, the forces exerted on the probe by the mooring rope 40 during mooring action would tend to cause torque loads on the cap 96 sufficient to collapse the nose 30. By maintaining the probe 100 within that projected conical volume, the reaction loads are contained within those values which are resisted by the internal hull pressure of the nose 30 to preclude collapsing of the nose at the cap 36. That is, the probe 100 is kept sufficiently short to minimize damaging torque loads on the nose.

The nose 30 defines a right circular cone which has a cone axis 128. The sections 42 of nose 30 form the side wall of that cone and taper relative to axis 128 at an angle $\alpha$. The conical volume defined by the cable assemblies 38 also taper relative to the cone axis 128 at angle $\alpha$. The angle $\alpha$ is significant.

If angle $\alpha$ were too small, then the nose 30 would project cigar-like from the hull 11. The height of the cone relative to the diameter of the base would be such that a vertical force $F_2$ in the direction of arrow 130 normal to axis 128 would tend to bend such an elongated nose. For example, if the angle $\alpha$ were somewhat less than 49°, then a force $F_2$ in direction of arrow 130 might tend to bend the nose. Preferably, the angle $\alpha$ should be about 54° to avoid such collapsing. Collapsing is avoided due to the presence of the hull pressure on the cone. That is, a vertical force on the nose apex is resisted by significant reaction forces on that apex due to the existing internal hull pressure. It is believed that an angle of about 49° should be about the lower limit to which such collapsing is precluded. This angle, however, could vary somewhat from 49° within a few degrees.

The angle $\alpha$ also is significant relative to its maximum value. For example, if the angle $\alpha$ were 90°, the nose 30 would be flat and bulbous. If a force $F_1$ in the axial direction of arrow 132 were directed from the nose 30 along axis 128, when the angle $\alpha$ is 90°, then the nose would tend to readily collapse because of the inward pull of the sixteen cables 38. That is, the nose surface in this case would be perpendicular to the direction of the force $F_1$ and the nose being a pliable inflatable material, would readily tend to collapse. By making the conical surface of the nose 30 at angle $\alpha$ of about 54°, it is believed that the nose and the cable assemblies 38 exhibit maximum resistance to collapsing in response to an axial force $F_1$. This resistance, is created by the internal hull pressure. The angle can have an upper limit of about 59° for this purpose. The angle $\alpha$ of 54° is believed to be optimum to permit the normal internal hull pressure to resist respective forces $F_1$ and $F_2$ in directions parallel to and normal to the cone axis 128. It is believed that the angle could vary somewhat from the optimum angle of 54° by about 5° in either direction while maintaining the resistance of the nose 30 to collapsing in response to the forces $F_1$ and $F_2$. If the nose angle $\alpha$ were significantly greater than 59°, then it is believed that the resistance to a given force $F_1$ on the nose would diminish. Thus, the angle $\alpha$ is a compromise for resisting collapsing in response to forces in two directions, one parallel and the other normal to axis 128. The angle $\beta$ is subtended by the nose 30, is thus double the value of $\alpha$, and may be 108° ±10°.

While the nose 30 has been illustrated in the present embodiment as frustro-conical, it should be apparent that the nose 30 could also comprise a conical structure totally filling the projected volume 124. In this case, the cap 36 would also be a conical structure which has a conical cavity which closely receives such a conical nose.

Because the nose 30 constructed in accordance with the present invention is able to resist normal forces $F_2$ in the direction of arrow 130, FIG. 7, nose rope 40 may now be used, in this embodiment, for winching the aerostat in the direction of arrow 130 toward its mooring position. Because of this, only two close haul ropes 26 and 28, FIG. 1, in combination with the nose rope 40, together provide sufficient balanced forces on the aerostat 10 to winch the aerostat into its moored position in a vertical direction. As a result, the second pair of close haul ropes parallel to the ropes 26 and 28 of prior systems may be eliminated from the aerostat 10, saving weight for additional payload. In prior systems, a minimum of four close haul ropes were required because vertical forces could not be imposed upon the cigar-shaped inflatable nose during mooring.

What is claimed is:
1. A aerostat structure comprising:
an inflatable hull including a forward substantially conical soft nose section defining a cone axis, a central body section and a rearward tail section, all of said sections being inflatable as an integral unit;
said nose section comprising an inflatable envelope which tapers to its cone apex at a given angle to said cone axis;
a mooring nose cap having a conical recess dimensioned to closely receive therein and abut said nose section at said cone apex, said cap including an upstanding mooring probe; and
cap securing means including a plurality of ropes for securing the cap to said hull at a region spaced from the nose apex, said ropes lying in a conical envelope closely spaced from and juxaposed with said nose section conical envelope wherein the envelopes define similar cones, said mooring probe terminating at its extended end substantially within the conical volume defined by the envelope of said ropes, said given angle having a value sufficiently great such that a force on said probe normal to said axis is counteracted with a sufficient reaction force created by the hull internal pressure to preclude significant bending of said nose section relative to said body section in a direction normal to said axis, said given angle having a value sufficiently small to preclude significant inward collapsing of the nose section in response to an axially directed force on said probe in a direction along said axis.

2. The structure of claim 1 wherein said cap securing means includes a plurality of patches secured to the hull spaced about the nose section and a like plurality of cables of adjustable length and under tension, one end of each said cables being secured to a corresponding different patch and the other end to said cap.

3. The structure of claim 1 wherein said given angle is in the range of about 49° to 59°.

4. The structure of claim 1 wherein said nose, central body and tail sections are made of material which has substantially the same construction.

5. An aerostat structure comprising:
an inflatable hull including a forward substantially conical soft nose section defining a cone axis, a central body section and a rearward tail section, all of said sections being inflatable as an integral unit;
said nose section comprising an inflatable envelope which tapers to its cone apex at a given angle to said cone axis, said envelope including a circular array of like isosceles trapezoidal fabric sections joined at their edges to form a hollow structure defining a central opening and a circular member joined to said trapezoidal sections at said central opening;
a mooring nose cap having a conical recess dimensioned to closely receive therein and abut said nose section at said cone apex; and
cap securing means including a plurality of ropes for securing the cap to said hull at a region spaced from the nose apex, said ropes lying in a conical envelope closely spaced from and juxtaposed with said nose section conical envelope wherein the envelopes define similar cones, said given angle having a value sufficiently great such that a force on said cone normal to said axis at said apex is counteracted with a sufficient reaction force created by the hull internal pressure to preclude significant bending of said nose section relative to said body section in a direction normal to said axis, said given angle having a value sufficiently small to preclude significant inward collapsing of the nose section in response to an axially directed force on said nose section in a direction along said axis.

6. The structure of claim 5 wherein said nose cap has a frustro-conical recess having a circular base wall dimensioned to abut said circular member.

7. The structure of claim 5 wherein said trapezoidal sections are joined at their edges with juxtaposed outer and inner tape layers of different widths, each layer comprising a polyester fabric coated on both sides with polyurethane.

8. An aerostat structure comprising:
an inflatable hull including a forward substantially conical nose section defining a cone axis, a central body section and a rearward tail section, all of said sections being inflatable as an integral unit;
said nose section comprising an inflatable envelope which tapers to its cone apex at a given angle to said cone axis;
a mooring nose cap having a conical recess dimensioned to closely receive therein and abut said nose section at said cone apex; and
cap securing means including a plurality of ropes for securing the cap to said hull at a region spaced from the nose apex, said means pivotally securing each said rope to said hull and to said cap at opposite rope ends, said ropes lying in a conical envelope closely spaced from and juxtaposed with said nose section conical envelope wherein the envelopes define similar cones, said given angle having a value sufficiently great such that a force on said cone normal to said axis at said apex is counteracted with a sufficient reaction force crated by the hull internal pressure to preclude significant bending of said nose section relative to said body section in a direction normal to said axis, said given angle having a value sufficiently small to preclude significant inward collasping of the nose section in response to an axially directed force on said nose section in a direction along said axis.

9. A soft aerostat nose structure for an inflatable aerostat hull comprising:
a substantially inflatable fabric, cone-shaped nose having a somewhat circular outer peripheral edge distal the nose apex and adapted to be secured to said hull so that the nose inflates simultaneously with the inflation of said hull;
a rigid nose cap juxtaposed in abutting relation with said nose at the nose apex; and
cap securing means adapted for securing the cap to said hull; said nose having a tapered side wall which extends at a given angle to the axis of the cone defined by the nose, said angle having a value in the range of about 49° and 59°, said nose being in the form of a frustro-conical envelope, and said nose cap including an upright hollow probe, the extended end of which lies within the projected apex of said nose envelope.

10. The structure of claim 9 wherein said cap securing means includes a plurality of adjustable length ropes secured to said cap at one end and adapted to be secured to said hull at the other end for the length of said nose.

11. The structure of claim 9 wherein said nose and hull comprise the same fabric structure.

12. A aerostat nose structure for an inflatable aerostat hull comprising:
a substantially inflatable fabric nose having a somewhat circular outer peripheral edge distal the nose apex and adapted to be secured to said hull so that the nose inflates simultaneously with the inflation of said hull, said nose including a plurality of trapezoidal fabric sections and a plurality of fabric tapes juxtaposed with selected portions of said sections at their equal length edges for securing said sections edge to edge;
a rigid nose cap juxtaposed in abutting relation with said nose at the nose apex; and
cap securing means adapted for securing the cap to said hull; said nose having a tapered side wall which extends at a given angle to the axis of the cone defined by the nose, said angle having a value in the range of about 49° to 59°.

13. An aerostat nose structure for an inflatable aerostat hull comprising:
a substantially inflatable fabric nose having a somewhat circular outer peripheral edge distal the nose apex and adapted to be secured to said hull so that the nose inflates simultaneously with the inflation of said hull, said nose comprising a plurality of trapezoidal sections of fabric joined at abutting facing edges to provide trapezoidal section joints, said trapezoidal sections terminating at a central circular opening adjacent the apex of the nose, a cover and inner tape of different widths over each joint, a scuff strip secured to and over the mid-region of each section extending from about said cap to about said outer peripheral edge, a circular member secured to said trapezoidal sections in said circular opening to form a circular flat region, and a plurality of patch members, each patch member corresponding to and secured to and over an end of a different scuff strip and adapted to be secured to and over said hull at said outer peripheral edge;

a rigid nose cap juxtaposed in abutting relation with said nose at the nose apex; and cap securing means adapted for securing the cap to said hull and including a plurality of adjustable length ropes secured to said cap at one end and adapted to be secured to said hull at the other end for the length of said nose, said nose having a tapered side wall which extends at a given angle to the axis of the cone defined by the nose, said angle having a value in the range of about 49° to 59°.

14. The structure of claim 13 wherein said cap securing means includes a plurality of ropes, each juxtaposed over a different scuff strip and pivotally secured at one end to said nose cap and at the other end to a patch member.

15. An inflatable aerostat hull construction comprising:
    a tail section;
    a body section; and
    a nose section;
    each of said sections comprising a fabric material forming an integral inflatable hull;
    said nose section including a right circular frustroconical member comprising a circular array of like tapered elongated sections secured to one another at their side edges in edge abutting relation;
    tape means for joining said tapered elongated sections to one another and for joining the nose section to said body section;
    a plurality of like fabric patch members secured juxtaposed centrally with each tapered elongated section at its joint with the body section;
    a rigid mooring nose cap juxtaposed with the nose section at the nose section apex;
    a plurality of ropes, each secured at one end to the nose cap and at its other end to a different patch member; and
    a mooring probe secured upstanding from the cap, said tapered elongated sections extending at an angle in the range of about 49° to 59° to the axis of the cone formed by the nose section.

16. The hull construction of claim 15 wherein said tapered elongated sections are of isosceles trapezoidal shape, said nose section further including a circular member secured to said tapered elongated sections at the nose apex to form a flat region lying in a plane normal to the conical axis of the nose section.

17. The construction of claim 16 wherein said patch means are bonded over the respective joints of said tapered elongated sections with said body section.

18. An aerostat construction comprising:
    an inflatable integral aerostat structure comprising a central body section, a soft conical nose section secured to the body section and having a given cone axis, and a tail section secured to the body section opposite the nose section;
    a pair of close haul ropes, one secured on each side of the body section; and
    a nose rope attached to said nose section;
    said nose section being in the shape of a right circular frustrum of a cone subtending a cone angle in the range of about 98° to 118°, such that said nose section substantially resists collapsing in response to a mooring force on said nose section induced by the nose rope in a direction normal to the cone axis and to an axially directed mooring force parallel to the cone axis, the attachment of said mooring rope to said nose section being at a point substantially within the projected conical envelope of said nose section between its truncated end and the apex thereof.

* * * * *